US009579780B1

(12) United States Patent
Elsasser et al.

(10) Patent No.: US 9,579,780 B1
(45) Date of Patent: *Feb. 28, 2017

(54) QUICK-CONNECT COUPLING AND DECOUPLING TOOL

(71) Applicant: International Business Machines Corporation, Armonk, NY (US)

(72) Inventors: Ryan N. Elsasser, Poughkeepsie, NY (US); Mateusz P. Koziol, Poughkeepsie, NY (US); Charles E. Mellinger, Ridgefield, CT (US); Annam K. Nguyen, Poughkeepsie, NY (US); Enrico A. Romano, Poughkeepsie, NY (US); Paul Samaniego, Port Ewen, NY (US); Robert Weiss, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,518

(22) Filed: Feb. 12, 2016

Related U.S. Application Data

(63) Continuation of application No. 14/932,132, filed on Nov. 4, 2015.

(51) Int. Cl.
*B25B 27/10* (2006.01)
*B23P 19/04* (2006.01)
*F16L 37/02* (2006.01)

(52) U.S. Cl.
CPC ............. *B25B 27/10* (2013.01); *B23P 19/04* (2013.01); *F16L 37/02* (2013.01)

(58) Field of Classification Search
CPC ......... B25B 1/02; B25B 1/24889; B25B 5/02; B25B 9/04; B25B 27/02; B25B 27/10
See application file for complete search history.

(56) References Cited

U.S. PATENT DOCUMENTS 3,299,496 A * 1/1967 Christensen ............ B25B 27/10
29/237
3,325,885 A * 6/1967 Ziegler, Jr. ............. H01R 43/00
29/256

(Continued)

OTHER PUBLICATIONS

Elsasser et al., "Quick-Connect Coupling and Decoupling Tool", U.S. Appl. No. 14/932,132, filed Nov. 4, 2015, 30 pages.

(Continued)

*Primary Examiner* — Jason L Vaughan
(74) *Attorney, Agent, or Firm* — Steven L. Fisher-Stawinski (57) ABSTRACT

A quick-connect coupling tool includes a first member and a second member. The second member is slidably affixed to the first member. The quick-connect coupling tool further includes a first pair of prongs and a second pair of prongs, the first pair of prongs is affixed to the first member, oriented in a first direction, and orthogonal to the first member. The second pair of prongs is affixed to the first member, oriented in the first direction, and orthogonal to the second member. The quick-connect coupling tool includes a first urging means for urging the first pair of prongs and the second pair of prongs apart and a second urging means for urging the first pair of prongs and the second pair of prongs together. The first urging means and the second urging means are affixed to the first member and the second member.

1 Claim, 7 Drawing Sheets

(56) References Cited

U.S. PATENT DOCUMENTS

| | | | |
|---|---|---|---|
| 5,099,561 A * | 3/1992 | Santiago Lozano | B25B 5/02 269/127 |
| 5,209,562 A * | 5/1993 | Glassford | F21S 6/003 362/294 |
| 5,226,230 A | 7/1993 | Klinger | |
| 5,471,728 A | 12/1995 | Feese et al. | |
| 5,537,727 A | 7/1996 | Mayer | |
| 5,664,309 A | 9/1997 | Albrecht | |
| 6,182,347 B1 | 2/2001 | Reed et al. | |
| 6,314,629 B1 | 11/2001 | Showalter, Sr. et al. | |
| 6,375,227 B1 | 4/2002 | Brenner | |
| 6,386,532 B1 * | 5/2002 | Donovan | B25B 5/06 269/25 |
| 6,817,089 B2 | 11/2004 | Whitehead | |
| 7,278,640 B2 | 10/2007 | Allan et al. | |
| 7,303,220 B2 | 12/2007 | Zellak | |
| 7,823,271 B2 * | 11/2010 | Xie | H01R 43/048 29/237 |
| 8,256,079 B2 * | 9/2012 | Hwang | B21D 39/046 29/237 |
| 8,307,529 B2 * | 11/2012 | Chapin | B25B 27/02 29/270 |
| 8,336,856 B2 | 12/2012 | Nelson et al. | |
| 8,341,816 B1 | 1/2013 | Swinford | |
| 8,356,402 B2 * | 1/2013 | Xie | B25B 27/10 29/237 |
| 8,458,877 B1 | 6/2013 | Falconette | |
| 8,869,330 B1 | 10/2014 | Arvisais | |
| 8,978,226 B2 | 3/2015 | Kady et al. | |
| 2008/0314205 A1 | 12/2008 | Feliciano | |
| 2010/0031486 A1 | 2/2010 | Catlin | |
| 2013/0326854 A1 | 12/2013 | Kady et al. | |

OTHER PUBLICATIONS

IBM, Appendix P, "List of IBM Patents or Patent Applications Treated as Related", dated Sep. 20, 2016, 2 pages.

* cited by examiner

QUICK-CONNECT COUPLING AND DECOUPLING TOOL

BACKGROUND

The present invention relates generally to quick-connect fittings, and more particularly to tools for manipulating quick-connect fittings.

A hose coupler connects a hose with another hose, tap, or hose appliance, such as an irrigation sprinkler. A quick-connect fitting provides a fast, make-or-break connection of fluid transfer lines. Quick-connect fittings may be installed by hand, as opposed to threaded or flanged connectors, which require wrenches. Quick-connect fittings may be installed in poorly lit and/or confined spaces. This may create difficult or dangerous conditions for technicians.

SUMMARY

A quick-connect coupling tool includes a first member and a second member. The first member includes a first member top face, a first member bottom face, a first member first end, and a first member second end. The second member includes a second member top face, a second member bottom face, a second member first end, and a second member second end. The second member is slidably affixed to the first member such that the first member top face and the second member bottom face are slidably opposed to one another. The quick-connect coupling tool further includes a first pair of prongs and a second pair of prongs, the first pair of prongs is affixed to the first member first end, the first pair of prongs is oriented in a first direction, orthogonal to the first member top face. The second pair of prongs is affixed to the second member first end. The second pair of prongs is oriented in a first direction, orthogonal to the second member top face. The quick-connect coupling tool includes a first urging means for urging the first pair of prongs and the second pair of prongs apart along an action line into a neutral configuration. The quick-connect coupling tool further includes a second urging means for urging the first pair of prongs and the second pair of prongs together along the action line from the neutral configuration. The first urging means for urging the first pair of prongs and the second pair of prongs together along the action line from the neutral configuration is affixed to the first member and the second member. The second urging means for urging the first pair of prongs and the second pair of prongs together along the action line from the neutral configuration is affixed to the first member and the second member. A quick-connect and quick-connect tool system and a method of using the quick-connect and quick-connect tool system are also disclosed.

DETAILED DESCRIPTION

Figure 1:
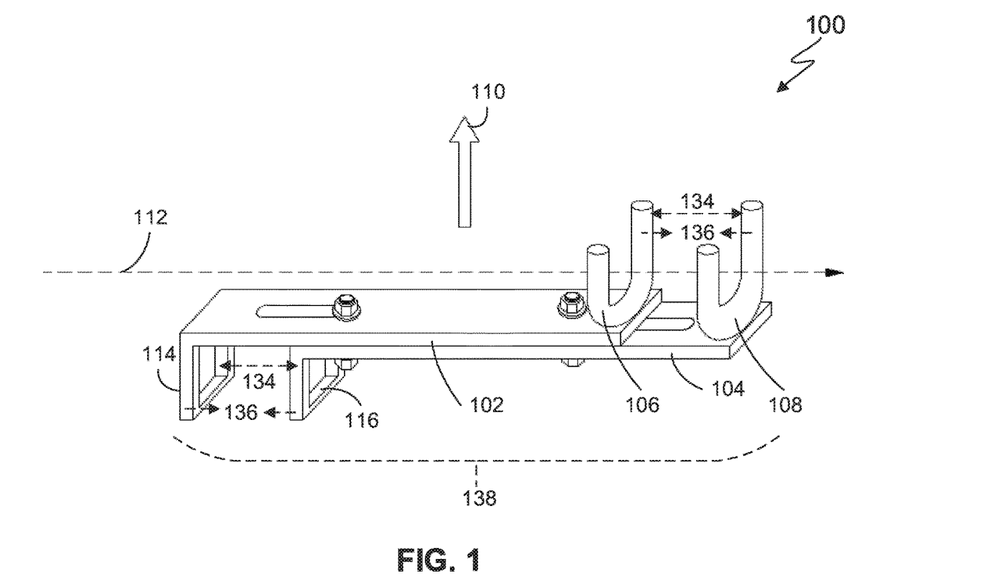
FIG. 1 is a perspective view of a quick-connect coupling tool, in accordance with an embodiment of the present invention.
Figure 2:
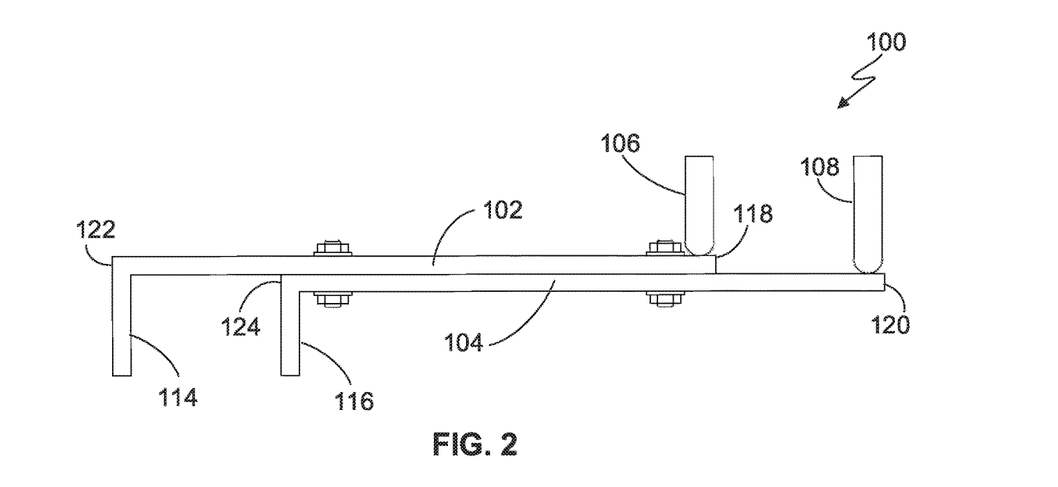
FIG. 2 is a side view of a quick-connect coupling tool, in accordance with an embodiment of the present invention.
Figure 3:
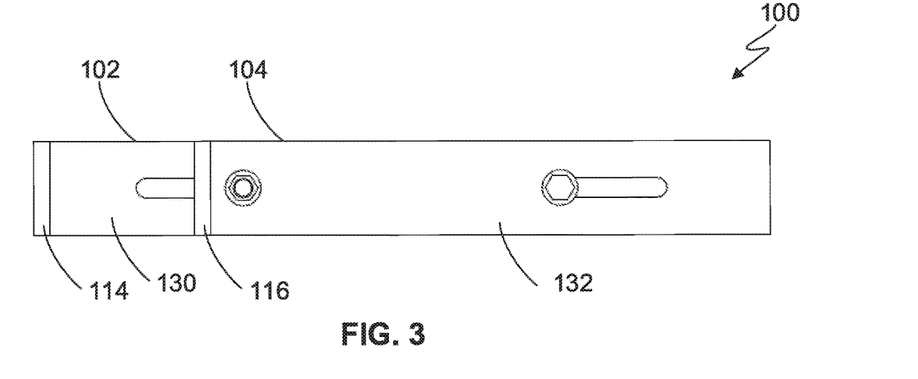
FIG. 3 is a bottom view of a quick-connect coupling tool, in accordance with an embodiment of the present invention.
Figure 4:
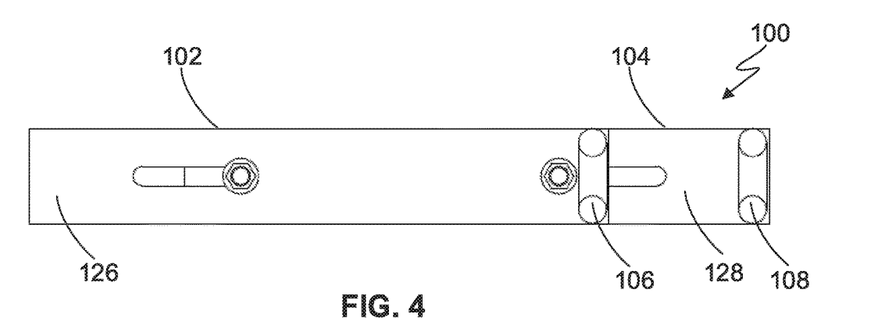
FIG. 4 is a top view of a quick-connect coupling tool, in accordance with an embodiment of the present invention.

FIG. 1, FIG. 2, FIG. 3, and FIG. 4 illustrate various views of the quick-connect tool 100. FIG. 1 illustrates a perspective view of the quick-connect tool 100. FIG. 2 illustrates a side view of the quick-connect tool 100. FIG. 3 illustrates a bottom view of the quick-connect tool 100. FIG. 4 illustrates a top view of the quick-connect tool 100.

The quick-connect tool 100 includes a first member 102, which includes a first member top face 126, a first member bottom face 130, a first member first end 118, and a first member second end 122. The quick-connect tool 100 includes a second member 104, which includes a second member top face 128, a second member bottom face 132, a second member first end 120, and a second member second end 124. The quick-connect tool 100 has a first pair of prongs 106, a second pair of prongs 108, a first urging member 114, and a second urging member 116.

The first member 102 may be a rigid, rectangular shaped panel. In some embodiments, the first member 102 may be constructed from any of a variety of rigid or semi-rigid materials, including aluminum, stainless steel, a metal alloy, rigid plastic, or wood. The first member top face 126 may be a flat top surface of the first member 102. The first member bottom face 130 may be a flat bottom surface of the first member 102, as shown. The first member bottom face 130 and the first member top face 126 may be two flat surfaces of the first member 102 and opposite one another. The first member 102 may have four sidewall faces.

In some embodiments, the first member first end 118 is one of the first member 102's four sidewall faces. In other embodiments, the first member first end 118 is a rectangular portion of the first member top face 126 along one of the first member 102's edges. The first pair of prongs 106 is affixed to the first member 102 at the first member first end 118. The first pair of prongs 106 may be a rigid, u-shaped configuration. The first pair of prongs 106 may be constructed from any of a variety of rigid or semi-rigid materials, including aluminum, stainless steel, a metal alloy, rigid plastic, or wood. The first pair of prongs 106 may be rigidly affixed to the first member 102 at the first member first end 118 and orthogonal to the first member top face 126, oriented in a first direction as indicated by an arrow 110.

The second member 104 may be a rigid, rectangular shaped panel. In some embodiments, the second member 104 may be constructed from any variety of rigid or semi-rigid materials, including aluminum, stainless steel, a metal alloy, rigid plastic, or wood. The second member top face 128 may be a flat top surface of the second member 104. The second member bottom face 132 may be a flat bottom surface of the second member 104. The second member bottom face 132 and the second member top face 128 may be two flat surfaces of the second member 104 and opposite one another. The second member 104 may have four sidewall faces.

In some embodiments, the second member first end 120 is one of the second member 104's four sidewall faces. In other embodiments, the second member first end 120 is a rectangular portion of the second member top face 128 along one of the second member 104's edges. The second pair of prongs 108 is affixed to the second member 102 at the second member first end 120. The second pair of prongs 108 may be constructed from any of a variety of rigid or semi-rigid materials, including aluminum, stainless steel, a metal alloy, rigid plastic, or wood. The second pair of prongs 106 may be a rigid, u-shaped material. The second pair of prongs 108 may be rigidly affixed to the second member 104 at the second member first end 120 and orthogonal to the second member top face 128, oriented in the first direction as indicated by the arrow 110.

The first urging member 114 may be a rigid structure, as shown, rigidly affixed to the first member second end 122. The first urging member 114 may be constructed from any of a variety of rigid or semi-rigid materials, including aluminum, stainless steel, a metal alloy, rigid plastic, or wood. In other embodiments, the first member second end 122 is on the first member bottom face 130 along one of the first member 102's four sidewall faces. In general, the first member second end 122 is opposed to the first member first end 118. In some embodiments, the first urging member 114 is a rigid rectangular panel. In some embodiments, the first urging member 114 is a handle with finger loops. In other embodiments, the first urging member 114 is a trigger. A trigger may consist of levers or buttons which may be actuated responsive to a user pressing or pulling the trigger. A trigger is a mechanical device that, responsive to a user pressing or pulling the trigger, sets off another mechanism. For example, the trigger may initiate a sliding process in which the first member 104 slides along the second member 102 in a slidable configuration (further illustrated in FIG. 5). The first urging member 114 may be an element rigidly affixed to the first member second end 122, orthogonal to the first member bottom face 130, and oriented opposite the first direction indicated by the arrow 110.

The first urging member 114 may be an element rigidly affixed to the first member second end 122. In some embodiments, the first member second end 122 is one of the first member 102's side faces. In other embodiments, the first member second end 122 is on the first member bottom face 130 along one of the first member 102's four sidewall faces. In general, the first member second end 122 is opposite the first member first end 118. In some embodiments, the first urging member 114 is a rigid rectangular panel. In some embodiments, the first urging member 114 is a handle with finger loops. In other embodiments, the first urging member 114 is a trigger. The first urging member 114 may be an element rigidly affixed to the first member second end 122, orthogonal to the first member bottom face 130, and oriented opposite the first direction indicated by the arrow 110.

The second urging member 116 may be an element rigidly affixed to the second member second end 124. The second urging member 116 may be constructed from any of a variety of rigid or semi-rigid materials, including aluminum, stainless steel, a metal alloy, rigid plastic, or wood. In general, the second member second end 124 is opposite the second member first end 120. In some embodiments, the second urging member 116 is a rigid rectangular panel. In some embodiments, the second urging member 116 is a handle with finger loops. In other embodiments, the second urging member 116 includes a trigger system. The second urging member 116 may be an element rigidly affixed to the second member second end 124, orthogonal to the second member bottom face 132, and oriented opposite the first direction indicated by the arrow 110.

Figure 5:
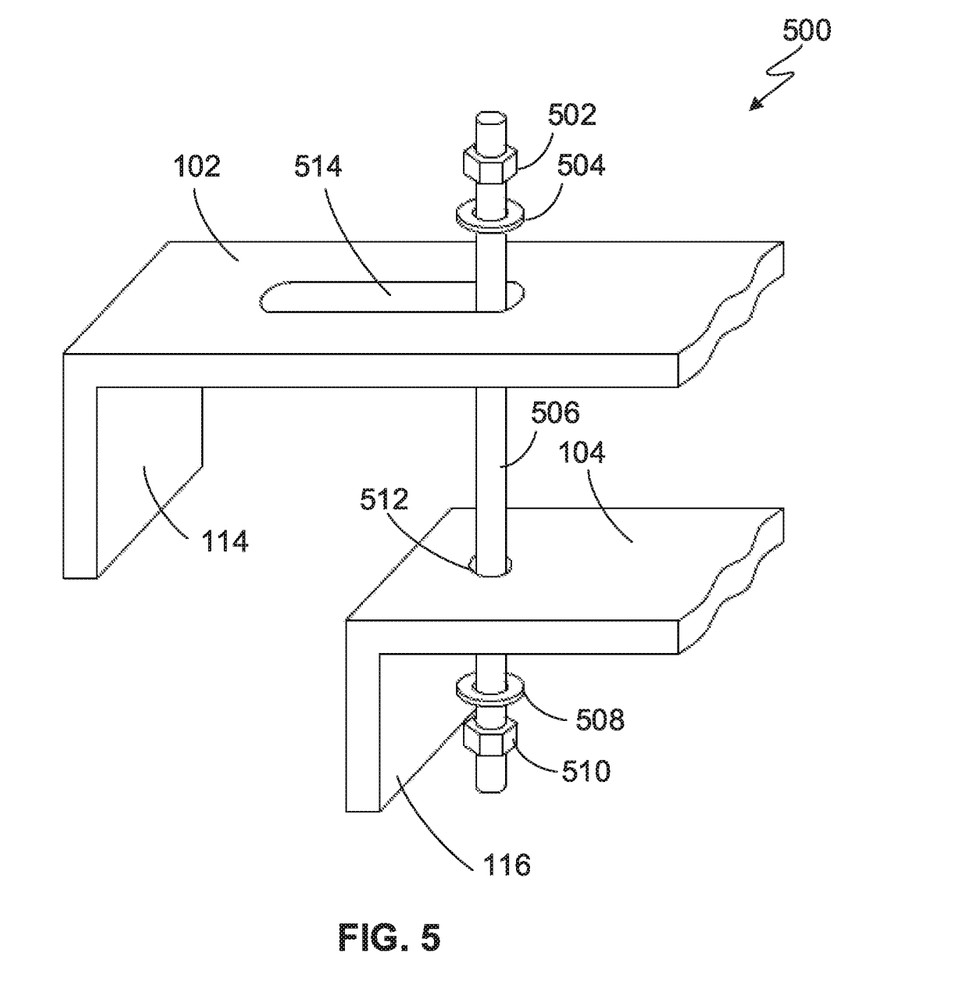
FIG. 5 is a perspective view of a slidable configuration for a quick-connect coupling tool, in accordance with an embodiment of the present invention.

The second member 104 and the first member 102 are slidably affixed to one another such that the first member bottom face 130 and the second member top face 128 are slidably opposed to one another. That is, the second member 104 and the first member 102 may slide back and forth opposite one another. FIG. 5 illustrates an exemplary slidable configuration by which the second member 104 and the first member 102 are slidably affixed to one another.

In some embodiments, the first urging member 114 and the second urging member 116, are a first urging means 134 (referred to herein, and in the claims, as a first urging means for urging the first pair of prongs 106 and the second pair of prongs 108 along an action line 112 into a neutral configuration 138). The action line 112 is illustrated in FIG. 1 as a dashed arrow (action line 112), indicating a direction that the quick-connect tool 100 moves when the quick-connect tool 100's slidable configuration is actuated. The neutral configuration 138 refers to a configuration similar to that depicted in FIG. 1, wherein the first pair of prongs 106 and the second pair of prongs 108 are separated.

The first urging member 114, the second urging member 116, the first pair of prongs 106, and the second pair of prongs 108 are all rigidly affixed to the quick-connect tool 100. In some embodiments, the quick-connect tool 100's slidable configuration causes the first urging member 114 and the second urging member 116 to move relative to one another within the slidable configuration of the quick-connect tool 100. In some embodiments, the first urging means 134 urges the first urging member 114 and the second urging member 116 apart from one another, which increases a distance between the first pair of prongs 106 and the second pair of prongs 108. The first urging means 134 is affixed to the first member 102 and the second member 104.

In some embodiments, the first urging means 134 includes a trigger system. In other embodiments, the first urging means 134 includes a spring (illustrated in FIG. 7). In other embodiments, the first urging means 134 includes finger loops to be operated upon by a human user (illustrated in FIG. 6). In other embodiments, the first urging means 134 may include a combination of springs, triggers, finger loops, handles, and/or urging members such as the first urging member 114 and the second urging member 116. In general, the first urging means 134 is any means and/or mechanism by which the quick-connect tool 100's sliding configuration may be actuated to urge the first pair of prongs 106 and the second pair of prongs 108 apart, thereby increasing a distance between them, along the action line 112 and into the neutral configuration 138.

In some embodiments, the first urging member 114 and the second urging member 116, are a second urging means 136 (referred to herein, and in the claims, as a second urging means for urging the first pair of prongs 106 and the second pair of prongs 108 together along the action line 112 from the neutral configuration 138).

In such embodiments, the second urging means 136 urges the first urging member 114 and the second urging member 116 closer to one another, which decreasing a distance between the first pair of prongs 106 and the second pair of prongs 108. The second urging means 136 is affixed to the first member 102 and the second member 104. In general, the second urging means 136 is any means and/or mechanism by which the quick-connect tool 100's sliding configuration may be actuated to urge the first pair of prongs 106 and the second pair of prongs 108 together, thereby decreasing a distance between them, along the action line 112 and from the neutral configuration 138.

In some embodiments, the second urging means 136 is the first urging means 134. In such embodiments, a user may, as when actuating scissors, actuate the first urging member 114 and second urging member 116 as handles both to compress the first pair of prongs 106 and second pair of prongs 108 from the neutral configuration 138 (second urging means) and to return the first pair of prongs 106 and second pair of prongs 108 to the neutral configuration 138 (first urging means).

In some embodiments, the first urging means 134 includes a trigger system. In other embodiments, the first urging means 134 includes a spring (illustrated in FIG. 7). In other embodiments, both the first urging means 134 and the second urging means 136 include finger loops to be operated upon by a human user (illustrated in FIG. 6), in a manner similar to actuating scissors. In other embodiments, the first urging means 134 may include a combination of springs, triggers, finger loops, handles, and/or urging members such as the first urging member 114 and the second urging member 116.

FIG. 5 illustrates a slidable configuration 500, which is an exemplary slidable configuration that the quick-connect tool 100 may include. FIG. 5 illustrates an embodiment by which the slidable configuration that slidably affixes the first member 102 and the second member 104. The slidable configuration includes the quick-connect tool 100 of FIG. 1-FIG. 4 and all associated parts, as well as a first hole 514, a first washer 504, a first nut 502, a slidable configuration bolt 506, a second hole 512, a second washer 508, and the second nut 510.

In some embodiments, the first washer 504, the first nut 502, the second washer 508, the second nut 510, and the slidable configuration bolt 506 are a nut-washer-bolt system to fasten the first member 102 and the second member 104. In other embodiments, other fasteners may be used to secure the first 102 and the second 104. For example, in some embodiments the slidable configuration bolt 506 may be a screw, nail, or rod. In some embodiments, the first nut 502, second nut 510, first nut 502, and/or second nut 510 may be end caps, fasteners, a nail-end, a rivet, a toggle, socket cap, an anchor, and/or another fastener. Some embodiments may not include the first washer 504 or the second washer 508. In general, the slidable configuration includes a connector piece, such as the slidable configuration bolt 506, and a means to secure the connector piece to the first member 102 and the second member 104, such as the nut-washer-bolt system including the first washer 504, the first nut 502, the second washer 508, the second nut 510, and the slidable configuration bolt 506.

The first hole 514 as illustrated in FIG. 5 is a rounded rectangular shaped hole that extends the entire height of the first member 102. The slidable configuration bolt 506 is free to move back and forth along the action line 112 within the first hole 514. The second hole 512 is a circular shaped hole that extends the entire height of the second member 104. The slidable configuration bolt 506 being securely fastened within the second hole 512 such that the slidable configuration bolt 506 may move freely within the first hole 514 and be held fixedly within the second hole 512. In other embodiments, the slidable configuration may include a system of tracks and/or rollers, wheels, and/or runners. In other embodiments, the slidable configuration may include a system of hinges.

Figure 6:
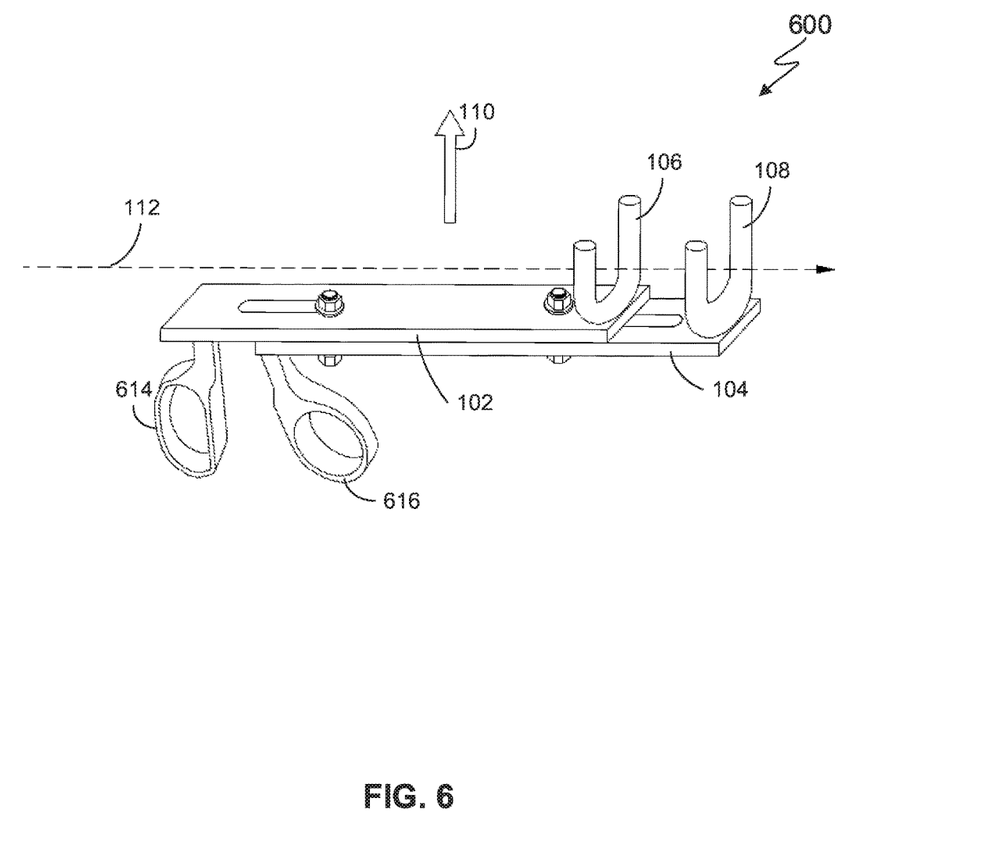
FIG. 6 is a perspective view of a quick-connect coupling tool with handles, in accordance with an embodiment of the present invention.

FIG. 6 illustrates an embodiment of the quick-connect tool 100, a finger-loop quick-connect tool 600 that is an apparatus similar to the quick-connect tool 100 of FIG. 1-FIG. 4 except that the first urging member 114 and the second urging member 116 are a handle 614 and a finger-loop 616. In such an embodiment a user may operate the quick-connect tool 100 by placing his or her hand within the handle 614 and the finger-loop 616 and actuate the first urging means 134 and the second urging means 136 by opening and closing his or her hand. In some embodiments, a user operating the finger-loop quick-connect tool 600 is similar to how a user may operate scissors.

Figure 7:
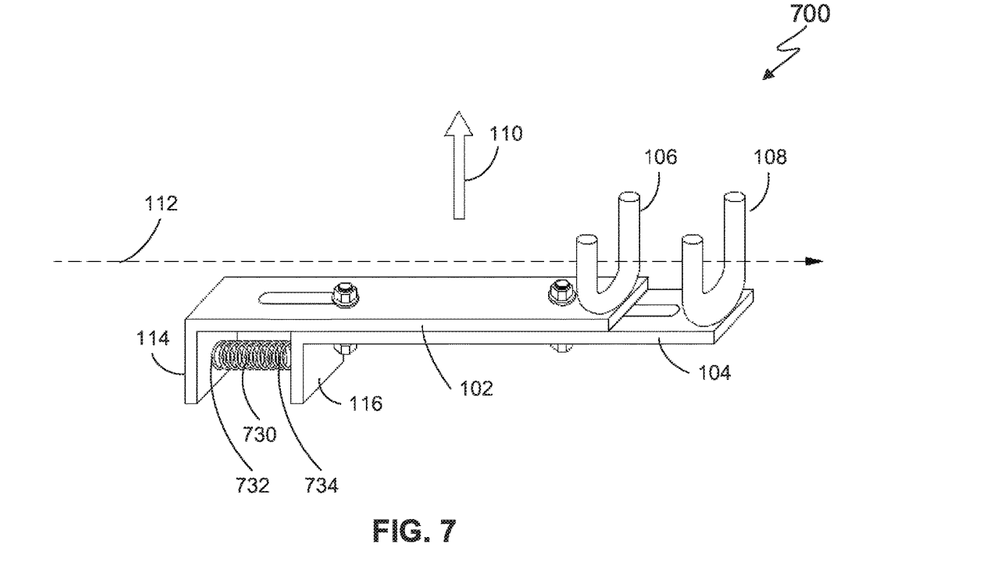
FIG. 7 is a perspective view of a quick-connect coupling tool with a spring, in accordance with an embodiment of the present invention.

FIG. 7 illustrates an embodiment of the quick-connect tool 100, a spring-loaded quick-connect tool 700 that is similar to the quick-connect tool 100 of FIG. 1-FIG. 4 except that the first urging means 134 includes a spring 730. The spring 730 is an elastic object used to store mechanical energy. In some embodiments, the spring 730 is constructed from spring steel. In other embodiments, the spring 730 may be constructed from metal, a metal alloy, and/or plastic. In some embodiments, the spring 730 is a coil spring. The spring 730 includes a spring first end 732 and a spring second end 734. In the embodiment of FIG. 7, the spring first end 732 is rigidly affixed to the first urging member 114 and the spring second end 734 is rigidly affixed to the second urging member 116. In some embodiments, the spring first end 732 and the spring second end 734 are affixed to the first urging member 114 and the second urging member 116 such that the spring 730 is at static mechanical equilibrium when the spring-loaded quick-connect tool 700 is in the neutral configuration 138.

Figure 8:
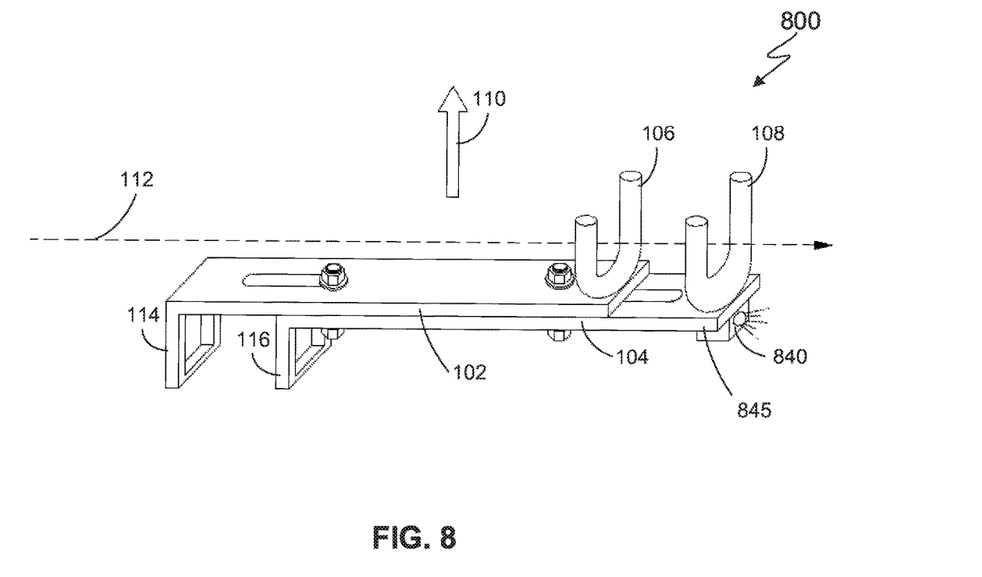
FIG. 8 is a perspective view of a quick-connect coupling tool with a light element, in accordance with an embodiment of the present invention.

FIG. 8 illustrates an embodiment of the quick-connect tool 100, a light element quick-connect tool 800 that is similar to the quick-connect tool 100 of FIG. 1-FIG. 4 except that the light element quick-connect tool 800 includes a light element 840. In some embodiments, the light element 840 is a light emitting diode. In other embodiments, the light element 840 is a lightbulb. In general, the light element 840 is an illuminating light source. The light element 840 is rigidly affixed to the quick-connect tool 100 at a position 845. In some embodiments, the position 845 is the second member 104. In other embodiments, the position 845 is the second member first end 120. In other embodiments, the position 845 is the second pair of prongs 108. In some embodiments, addition light elements similar to the light element 840 may be affixed to the quick-connect tool 100.

Figure 9:
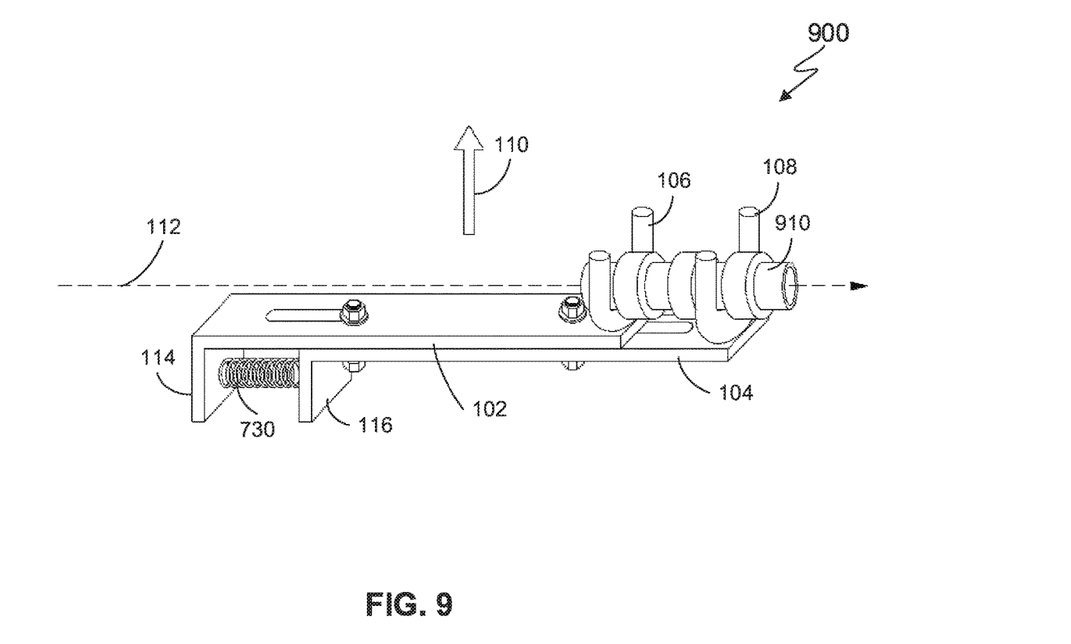
FIG. 9 is a perspective view of a quick-connect and quick-connect coupling tool system, in accordance with an embodiment of the present invention.

FIG. 9 illustrates a system 900 (sometimes referred to as a quick-connect and quick-connect coupling tool system) includes a quick-connect 910 and the spring-loaded quick-connect tool 700 and all associated parts. The quick-connect 910 may be a generic quick-connect fitting. In general, a quick-connect, such as the quick-connect 910 has a cylindrical shape with at least four regions and such that the quick-connect 910 is shaped to have at least two distinct diameters. The quick-connect 910 illustrated in FIG. 9 has seven regions with two distinct diameters. The first pair of prongs 106 is shaped so as to be complementary to one of the at least four regions of the quick-connect 910. The first pair of prongs 106 may be shaped to be u-shaped and have an internal arc and internal diameter that is similar to a region of the quick-connect 910. The second pair of prongs 108 is shaped so as to be complementary to another one of the at least four regions of the quick-connect 910. The second pair of prongs 108 may be shaped to be u-shaped and have an internal arc and internal diameter that is similar to a region of the quick-connect 910.

Figure 10:
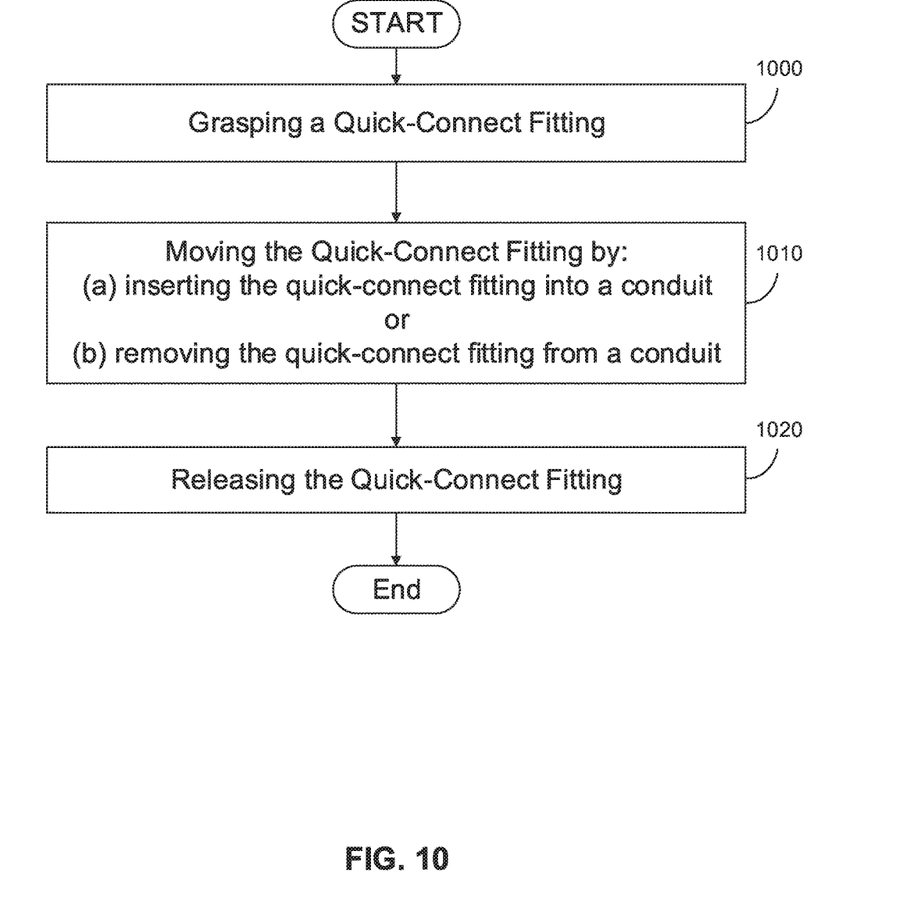
FIG. 10 is a flowchart depicting operational steps of a method of using a quick-connect and quick-connect coupling tool system, in accordance with at least one embodiment of the present invention.

FIG. 10 is a flowchart depicting operational steps of a method of using a quick-connect, such as the quick-connect 910, and quick-connect coupling tool system, such as the system 900, in accordance with at least one embodiment of the present invention. At step 1000 a quick-connect tool, such as the spring-loaded quick-connect tool 700, acts by grasping a quick-connect, such as the quick-connect 910. In embodiments wherein the spring-loaded quick-connect tool 700 acts by grasping the quick-connect 910, the spring-loaded quick-connect tool 700 grasps the quick-connect 910 within the first pair of prongs 106 and the second pair of prongs 108 by actuating the second urging means 136, (thereby taking an action) to decrease the distance between the first pair of prongs 106 and second pair of prongs 108. A quick-connect tool, such as the spring-loaded quick-connect tool 700, is able to grasp the quick-connect 910 because of a complementary shape between the first pair of prongs 106 and a region of the quick-connect 910, and a complementary shape between the second pair of prongs 108 and a region of the quick-connect 910. In some embodiments, each comprises a shape that is complementary to the quick-connect 910.

At step 1010 the system 900 acts by moving the quick-connect 910 by either inserting the quick-connect 910 into a conduit or removing the quick-connect 910 from a conduit. In general, quick-connect fittings are shaped to fit to a conduit. In some embodiments, a user may move the system 900 towards a conduit to insert the quick-connect 910 into a conduit. In other embodiments, a user may move the spring-loaded quick-connect tool 700 towards a quick-connect 910 that is already fitted to a conduit, perform the grasping action of step 1000 by actuating the second urging means 136, and pull the system 900 away from the conduit to remove the quick-connect 910 from the conduit.

At step 1020 the system 900 acts by releasing the quick-connect 910 from the spring-loaded quick-connect tool 700 and releasing the quick-connect fitting from the first pair of prongs 106 and the second pair of prongs 108 by actuating the first urging means 134 and increasing the distance between the first pair of prongs 106 and second pair of prongs 108. In some embodiments, actuating the first urging means 134 is done to increase a distance between the first pair of prongs 106 and the second pair of prongs 108. In some embodiments, the system 900 may perform a step of inserting the quick-connect 910 into a conduit by actuating the first urging means 134 and/or the second urging means 136. In some embodiments, the system 900 may perform a step of removing the quick-connect 910 from a conduit by actuating the first urging means 134 and/or the second urging means 136.

What is claimed is:

1. A method of using a quick-connect and quick-connect coupling tool system, the quick-connect and quick-connect coupling tool system comprising:
   a first member;
   said first member comprising a first member top face, a first member bottom face, a first member first end, and a first member second end;
   a second member;
   said second member comprising a second member top face, a second member bottom face, a second member first end, and a second member second end;
   said second member being slidably affixed to said first member such that said first member top face and said second member bottom face are slidably opposed to one another;
   a quick-connect fitting;
   said quick-connect fitting being shaped so as to comprise at least four regions;
   said at least four regions being cylindrical;
   said at least four regions being shaped so as to comprise at least two distinct diameters;
   a first pair of prongs;
   said first pair of prongs being affixed to said first member first end;
   said first pair of prongs being oriented in a first direction, orthogonal to said first member top face;
   said first pair of prongs being shaped so as to be complementary to at least one of said at least four regions;
   said first pair of prongs being shaped so as to be complementary to said quick-connect fitting by being shaped in a u-shaped configuration;
   a second pair of prongs;
   said second pair of prongs being affixed to said second member first end;
   said second pair of prongs being oriented in said first direction, orthogonal to said second member top face;
   said second pair of prongs being shaped so as to be complementary to at least one of said at least four regions;
   said second pair of prongs being shaped so as to be complementary to said quick-connect fitting by being shaped in a u-shaped configuration;
   a first urging means for urging said first pair of prongs and said second pair of prongs apart along an action line into a neutral configuration;
   a second urging means for urging said first pair of prongs and said second pair of prongs together along said action line from said neutral configuration;
   said first urging means for urging said first pair of prongs and said second pair of prongs apart along an action line into a neutral configuration being affixed to said first member and said second member;
   said second urging means for urging said first pair of prongs and said second pair of prongs together along an action line from a neutral configuration being affixed to said first member and said second member;
   a light element, said light element being affixed at a position selected from a group consisting of:
      (a) said second member;
      (b) said first member; and
      (c) second pair of prongs;
   a first urging member;
   said first urging member being affixed to said first member second end;
   said first urging member being oriented opposite said first direction, orthogonal to said first member top face;
   a second urging member;
   said second urging member being affixed to said second member second end;
   said second urging member being oriented opposite said first direction, orthogonal to said second member top face;
   a spring;
   said spring comprising a spring first end and a spring second end;
   said spring first end being affixed to said first urging member; and said spring second end being affixed to said second urging member; and the method comprising:

grasping said quick-connect fitting within said first pair of prongs and said second pair of prongs by actuating said second urging means for urging said first pair of prongs and said second pair of prongs together along an action line from a neutral configuration;

moving said quick-connect fitting by taking an action selected from a group consisting of:
  (a) inserting said quick-connect fitting into a conduit; and
  (b) removing said quick-connect fitting from a conduit;

releasing said quick-connect fitting from within said first pair of prongs and said second pair of prongs by actuating said first urging means for urging said first pair of prongs and said second pair of prongs apart along an action line into a neutral configuration.

* * * * *